US012263609B1

(12) United States Patent
Liu

(10) Patent No.: US 12,263,609 B1
(45) Date of Patent: Apr. 1, 2025

(54) CUTTER ASSEMBLY, PAPER CUTTER, PAPER DISTRIBUTOR AND PAPER CUTTING DEVICE

(71) Applicant: Yong Liu, Zhejiang (CN)

(72) Inventor: Yong Liu, Zhejiang (CN)

( * ) Notice: Subject to any disclaimer, the term of this patent is extended or adjusted under 35 U.S.C. 154(b) by 0 days.

(21) Appl. No.: 18/797,836

(22) Filed: Aug. 8, 2024

Related U.S. Application Data

(63) Continuation-in-part of application No. 18/539,909, filed on Dec. 14, 2023, now Pat. No. 12,090,678.

(30) Foreign Application Priority Data

Dec. 14, 2023 (CN) ......................... 202323416911.6
Aug. 2, 2024 (CN) ......................... 202421861231.7

(51) Int. Cl.

| | |
|---|---|
| ***B26B 27/00*** | (2006.01) |
| ***B26B 3/08*** | (2006.01) |
| ***B26B 29/06*** | (2006.01) |
| ***B26D 1/01*** | (2006.01) |
| ***B26D 1/04*** | (2006.01) |
| ***B26D 7/01*** | (2006.01) |
| ***B26D 7/14*** | (2006.01) |
| ***B65H 35/00*** | (2006.01) |

(52) U.S. Cl.
CPC ................ *B26B 3/08* (2013.01); *B26D 7/015* (2013.01); *B26D 7/14* (2013.01); *B65H 35/002* (2013.01)

(58) Field of Classification Search
CPC ........... B26B 27/00; B26B 3/08; B26B 29/06; B26D 2001/006; B26D 1/045; B26D 2210/11; B65H 2701/5112; B65H 35/002; B65H 2301/51532; B65H 2701/1944; B65H 2301/515123; B65H 2301/515; B65H 2301/51512; B65H 2301/515126
USPC ........ 83/651, 614, 635, 649; 30/2, 280, 294, 30/298, 298.4; D8/14, 48, 98; D18/34.3, D18/34.8
See application file for complete search history.

(56) References Cited

U.S. PATENT DOCUMENTS

| | | | | |
|---|---|---|---|---|
| 2,294,018 A * | 8/1942 | Borst | B26B 3/08 30/294 |
| D164,378 S * | 8/1951 | Mejia | D8/98 |
| 3,028,670 A * | 4/1962 | Tilly | B43M 7/002 30/294 |
| 3,618,788 A | 11/1971 | Murray | |
| 4,723,134 A | 2/1988 | Morita et al. | |
| 5,036,740 A * | 8/1991 | Tsai | B65H 35/0086 83/614 |
| 5,638,603 A * | 6/1997 | Li | B26B 27/00 30/294 |
| 8,469,072 B1 * | 6/2013 | Baca | B65H 35/0073 156/577 |

(Continued)

*Primary Examiner* — Ghassem Alie

(57) ABSTRACT

The embodiments of the present disclosure disclose a cutter assembly, a paper cutting device and a paper cutter. The paper cutter includes a housing, a cutter assembly and a pressure guide assembly. The housing includes a paper distributor housing, and a side wall of the paper distributor housing is defined with a paper discharging port. The housing also includes a paper cutter housing. The cutter assembly includes an object picking member, and one end of the object picking member has a flat and sharp paper picking end exposed outward. The pressure guide assembly assists in positioning and guiding the paper to be cut to slide straightly toward a blade.

13 Claims, 17 Drawing Sheets

(56) References Cited

U.S. PATENT DOCUMENTS

| | | | | |
|---|---|---|---|---|
| 8,495,818 | B1 * | 7/2013 | Peppett | B26B 5/005 30/282 |
| 8,783,984 | B2 | 7/2014 | Kim et al. | |
| D915,507 | S * | 4/2021 | Cran | D18/34.9 |
| D968,190 | S * | 11/2022 | Tang | D8/98 |
| D985,353 | S * | 5/2023 | Liu | D8/98 |
| 11,717,977 | B1 * | 8/2023 | Xie | B26B 3/08 30/278 |
| 2012/0180325 | A1 | 7/2012 | Wu et al. | |
| 2015/0059188 | A1 * | 3/2015 | Haas | B26B 3/08 30/279.2 |
| 2015/0068045 | A1 * | 3/2015 | Allen | B26B 29/06 30/294 |

* cited by examiner

CUTTER ASSEMBLY, PAPER CUTTER, PAPER DISTRIBUTOR AND PAPER CUTTING DEVICE

CROSS REFERENCE TO RELATED APPLICATIONS

This application claims priority benefits to Chinese Patent Application No. 2024218612317, filed on Aug. 2, 2024, and Chinese Patent Application No. 2023234169116, filed on Dec. 14, 2023, and is a continuation-in-part of U.S. patent application Ser. No. 18/539,909 filed on Dec. 14, 2023, which is a continuation of U.S. patent application Ser. No. 18/119,848, filed on Mar. 10, 2023, which are hereby incorporated by reference in their entirety.

TECHNICAL FIELD

The present disclosure relates to cutting tools for cutting roll paper, and in particular, to a cutter assembly, a paper cutter, a paper distributor and a paper cutting device.

BACKGROUND

A paper cutter is a mechanical device specially used for cutting paper and other similar materials (such as film, label, paperboard, etc.). It is widely used in areas such as printing, office, packaging, graphic production, education and handicrafts. Its main function is to accurately cut large sheets of material (i.e. paper) into a required size or shape to meet different usage requirements.

SUMMARY OF THE INVENTION

The embodiments of the present disclosure provide a cutter assembly, a paper cutter, a paper distributor and a paper cutting device, which mainly address the deficiencies in paper cutting efficiency, accuracy, safety and device adaptability, and have made a number of technical improvements and innovative designs to meet the market demand for high-quality and high-efficiency paper processing device.

A first aspect of the embodiments of the present disclosure provides a cutter assembly. The cutter assembly includes an object picking member. The object picking member includes a first part and a second part connected to the first part. The first part is thin and long, one end of the first part is provided with a flat and sharp paper picking end, and the paper picking end is able to reach under paper and pick the paper up. The object picking member is provided with a cutter, and a blade of the cutter faces the paper picking end.

The flat and sharp paper picking end may be inserted accurately under the paper to reduce damage to the paper surface, especially for fragile or high-gloss paper. It may effectively protect the integrity of the paper, and may accurately separate and lift the paper from the placement plane before cutting, ensuring accurate positioning of the paper during the cutting process. Only one step is required to complete the separation and cutting of the paper, which improves work efficiency and reduces the times of manual interventions and labor intensity. The blade of the cutter is designed to correspond to the traveling direction of the paper to be cut, ensuring that the straightness and accuracy of cutting be maintained regardless of whether it is a straight cut or a cut at a specific angle. It is suitable for cutting paper of different sizes and types, and enhances the versatility and adaptability of the cutter assembly. The above-mentioned cutter assembly ensures the safety and simplicity of operation, and meets the needs of efficient and high-quality paper processing.

A second aspect of the embodiments of the present disclosure provides a paper cutter. The paper cutter includes a cutter assembly, a housing and a pressure guide assembly. The cutter assembly includes an object picking member and a cutter, a first end of the object picking member has a paper picking end, the paper picking end is able to reach under paper and pick the paper up, and the object picking member is provided with a cutter near its second end, and a blade of the cutter is opposite to a traveling direction of the paper to be cut. The housing includes a paper cutter housing, the cutter assembly is connected to the paper cutter housing, left and right sides of the paper cutter housing both comprise side portions extending downward, lower edges of the side portions of the left and right sides are able to press downward on two sides of the paper picked up by the object picking member, such that two sides of the paper are pressed on a placement plane, and a second end of the object picking member is connected to the paper cutter housing. The pressure guide assembly is connected to the paper cutter housing and is arranged between the side portions of the left and right sides of the paper cutter housing, and the pressure guide assembly assists in positioning and guiding the paper to be cut to slide straightly toward the blade in response to the paper to be cut entering the cutter assembly.

The flexibility and versatility of the paper cutter enable it to adapt to paper of different sizes and materials. Whether it is thin paper or thicker paper, stable cutting may be achieved by adjusting and utilizing the structure of the housing and the pressure guide assembly, which enhances the market adaptability and user satisfaction of the device. The above technical features achieve high efficiency, precision, safety and automation in the paper cutting process through sophisticated structural design, improve the user experience and the overall efficiency of the cutting, and are an important advancement in the field of paper processing device design. The pressure guide assembly reduces friction and unnecessary mechanical stress during the paper transmission process by means of the rational layout of the paper pushing member and the stable paper guiding path, which helps to extend the service life of the device and reduce maintenance costs. The technical feature of the pressure guide assembly not only improves the cutting accuracy and efficiency by precisely controlling the changes in the shape of the paper during the guiding process, but also enhances the adaptability of the device and the operation convenience for the user. It is a key innovation point to improve the performance of the paper cutter.

A third aspect of the embodiments of the present disclosure provides a paper distributor. The paper distributor includes a paper distributor housing, the paper distributor housing has a hollow structure, a side wall of the paper distributor housing is defined with a paper discharging port configured for paper to be cut to be pulled out, the side wall of the paper distributor housing is provided with at least one parallel guide rail, the parallel guide rail is parallel to an axis of the paper distributor housing, the at least one parallel guide rail is adjacent to the paper discharging port, and the at least one parallel guide rail is able to prevent a paper roll from being pulled out of the paper discharging port while ensuring smooth paper discharge. The paper distributor housing and the parallel guide rail provided therein ensure that the entire paper distributor system maintains a compact structure while ensuring stability and durability under long-term use, thereby reducing maintenance costs and extending the service life of the device.

A fourth aspect of the embodiments of the present disclosure provides a paper cutting device. The paper cutting device includes a housing, a cutter assembly and a pressure guide assembly. The housing includes a paper cutter housing and a paper distributor housing with a hollow structure, a side wall of the paper distributor housing is defined with a paper discharging port. The cutter assembly includes an object picking member, a first end of the object picking member has a flat and sharp paper picking end, the paper picking end is exposed outward with respect to the paper feeding end of the paper cutter housing, a second end of the object picking member is connected to the paper cutter housing, the object picking member is provided with a cutter near its second end, and a blade of the cutter is opposite to a traveling direction of the paper to be cut. The pressure guide assembly is connected to an inside of the paper cutter housing, and the pressure guide assembly assists in positioning and guiding the paper to be cut to slide straightly toward the blade in response to the paper to be cut entering the cutter assembly.

The above-mentioned paper cutting device effectively improves the accuracy, efficiency and safety of cutting by arranging the cutter assembly, the pressure guide assembly and housing, while ensuring the stability, durability and wide applicability of the device, and providing users with an efficient, safe and easy-to-operate cutting solution. Through precise designing of the collaborative assemblies, it ensures the accurate guiding and positioning of the paper before cutting, improves the operation efficiency and quality of cutting, and improves the stability of the device and the operation convenience for users.

BRIEF DESCRIPTION OF DRAWINGS drawings constituting a part of the present disclosure are provided for a further understanding to the present disclosure, and are not intended to limit the present disclosure improperly.

REFERENCE SIGNS

Figure 1:
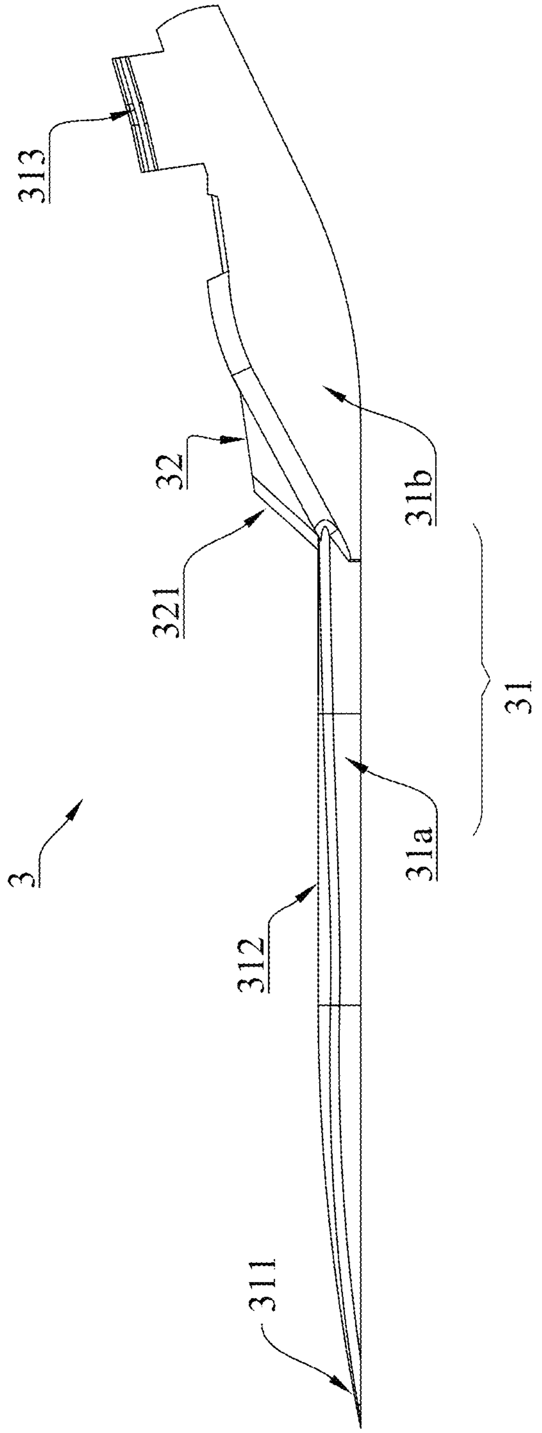
FIG. 1 is a schematic structural view of a cutter assembly according to embodiment 1 of the present disclosure.

1—housing; 11—parallel guide rail; 12—paper distributor housing; 13—paper discharging port; 14—slanted strip; 15—pressing handle; 16—paper cutter housing; 161—side portion; 162—lower edge; 163—paper guide edge; 164—paper feeding end; 165—first paper discharging groove; 166—second paper discharging groove; 17—paper pushing member mounting rib; 18—paper guide member mounting rib; 19—elastic buckle mounting groove; 2—pressure guide assembly; 21—paper pushing member; 21*a*—first paper pushing member; 21*b*—second paper pushing member; 22—fixing shaft; 23—paper guide member; 23*a*—first paper guide member; 23*b*—second paper guide member; 3—cutter assembly; 31—object picking member; 31*a*—first part; 31*b*—second part; 311—paper picking end; 312—contact bearing surface; 313—elastic buckle; 314—cutting blade mounting groove; 32—cutter; 321—blade; 4—paper tube; 41—paper.

DETAILED DESCRIPTION

The present disclosure is described in detail below with reference to the accompanying drawings and in conjunction with embodiments. Each example is provided to explain the present disclosure instead of limiting the present disclosure. In fact, those of ordinary skill in the art know that modifications and variations may be made in the present disclosure without departing from the scope or spirit of the present disclosure. For example, features shown or described as part of one embodiment may be used in another embodiment to produce yet another embodiment. Therefore, it is expected that the present disclosure includes such modifications and variations that fall within the scope of the appended claims and equivalents thereof.

In the descriptions of the present disclosure, orientational or positional relationships indicated by the terms "longitudinal", "transverse", "upper", "lower", "front", "back", "left", "right", "vertical", "horizontal", "top", "bottom" and the like are orientational or positional relationships based on the drawings, are only for the purpose of facilitating describing of the present disclosure, and do not indicate that the present disclosure must be constructed and operated in the specific orientations. Therefore, they cannot be understood as limitations on the present disclosure. The terms "connection", "connecting" and "arrangement" used in the present disclosure should be understood in a broad sense, for example, the connection may be fixed connection, and may also be detachable connection; the connection may be direct connection, and may also be indirect connection by means of intermediate components; the connection may be wired electrical connection and wireless electrical connection, and may also be wireless signal connection. For those of ordinary skill in the art, the specific meanings of the above-mentioned terms may be understood according to the specific situations.

The accompanying drawings show one or more examples of the present disclosure. Numeral and letter signs are used in the detailed descriptions to refer to the features in the accompanying drawings. Similar or like reference signs in the drawings and descriptions have been configured to refer to similar or like parts of the present disclosure. As used herein, the terms "first", "second", "third" and the like are used interchangeably to distinguish one component from another, and are not intended to indicate the positions or importance of individual components.

Embodiment 1

Figure 2:
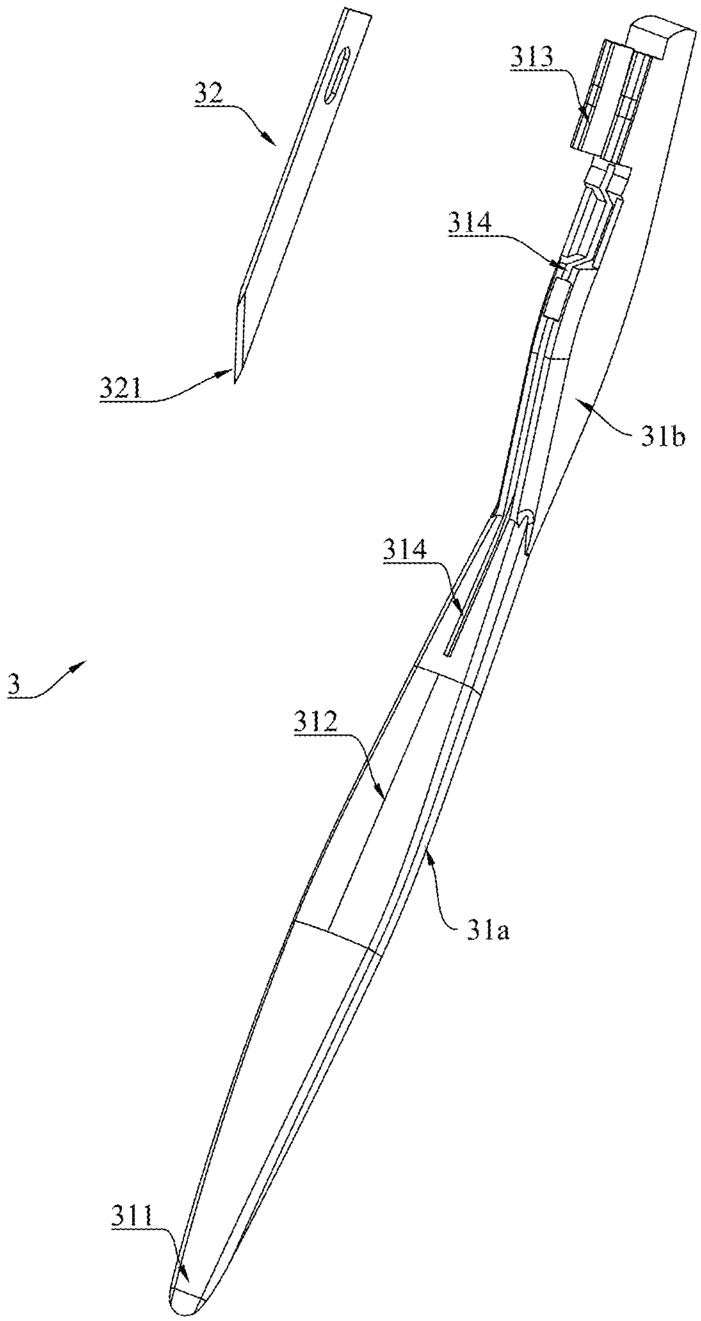
FIG. 2 is a schematic structural view of a dissembled cutter assembly according to embodiment 1 of the present disclosure.
Figure 3:
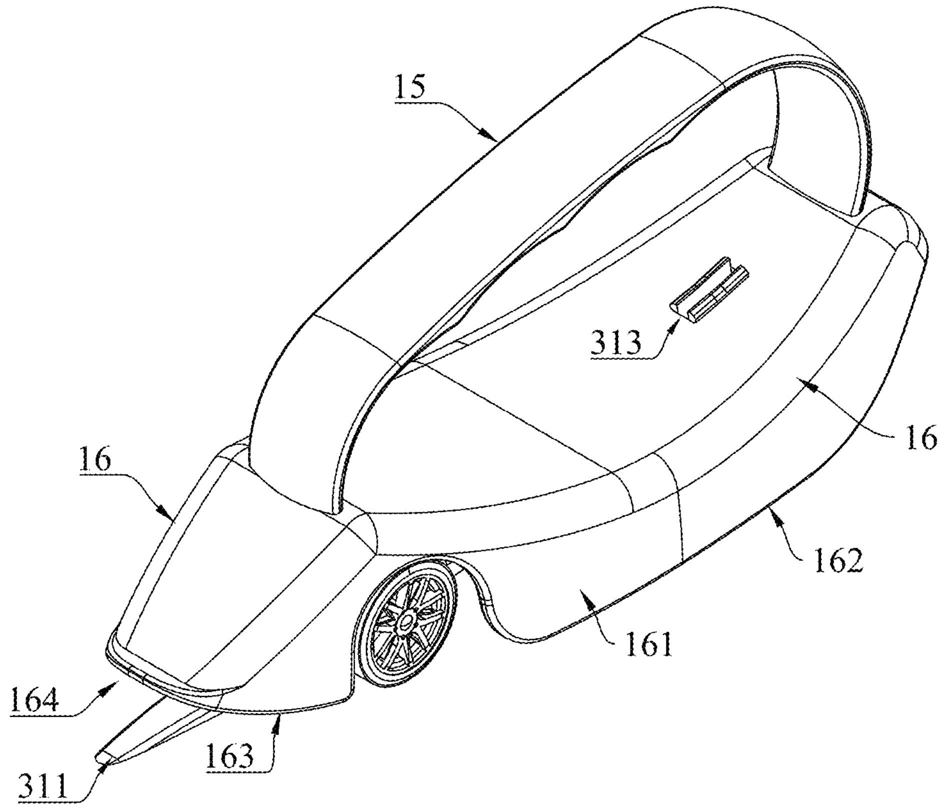
FIG. 3 is an overall schematic structural view of a paper cutter according to embodiment 2 of the present disclosure.
Figure 4:
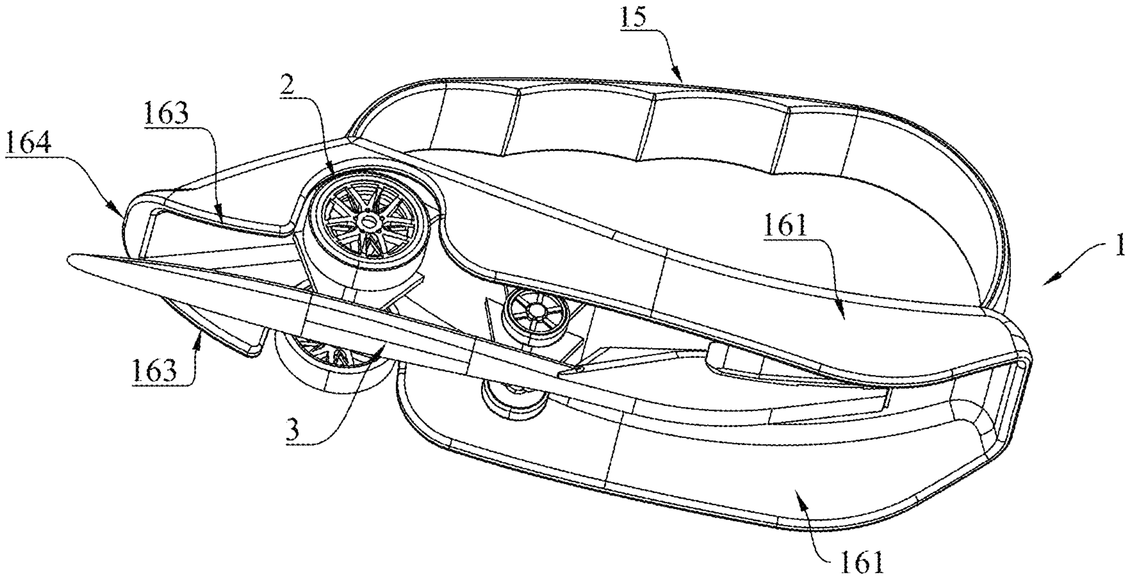
FIG. 4 is another overall schematic structural view of the paper cutter according to embodiment 2 of the present disclosure.
Figure 5:
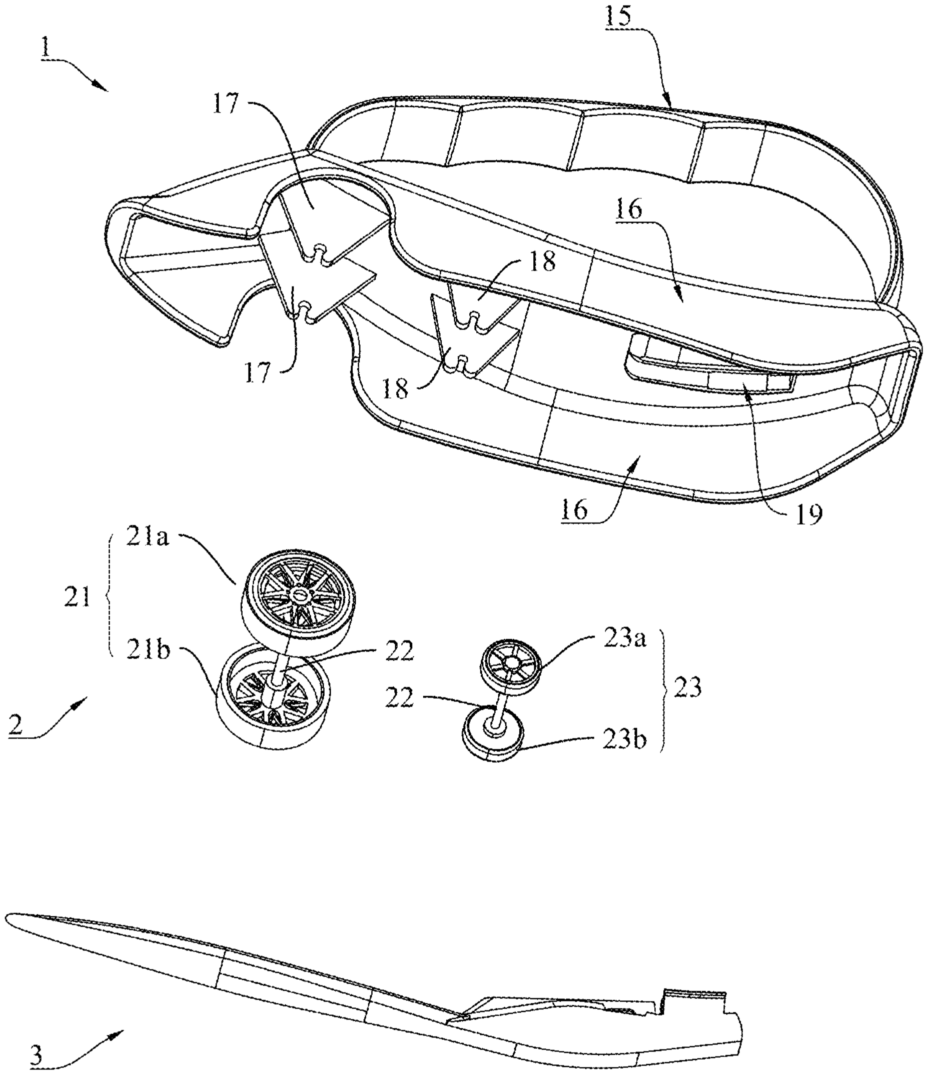
FIG. 5 is an exploded schematic structural view of the paper cutter shown in FIG. 4 according to embodiment 2 of the present disclosure.
Figure 6:
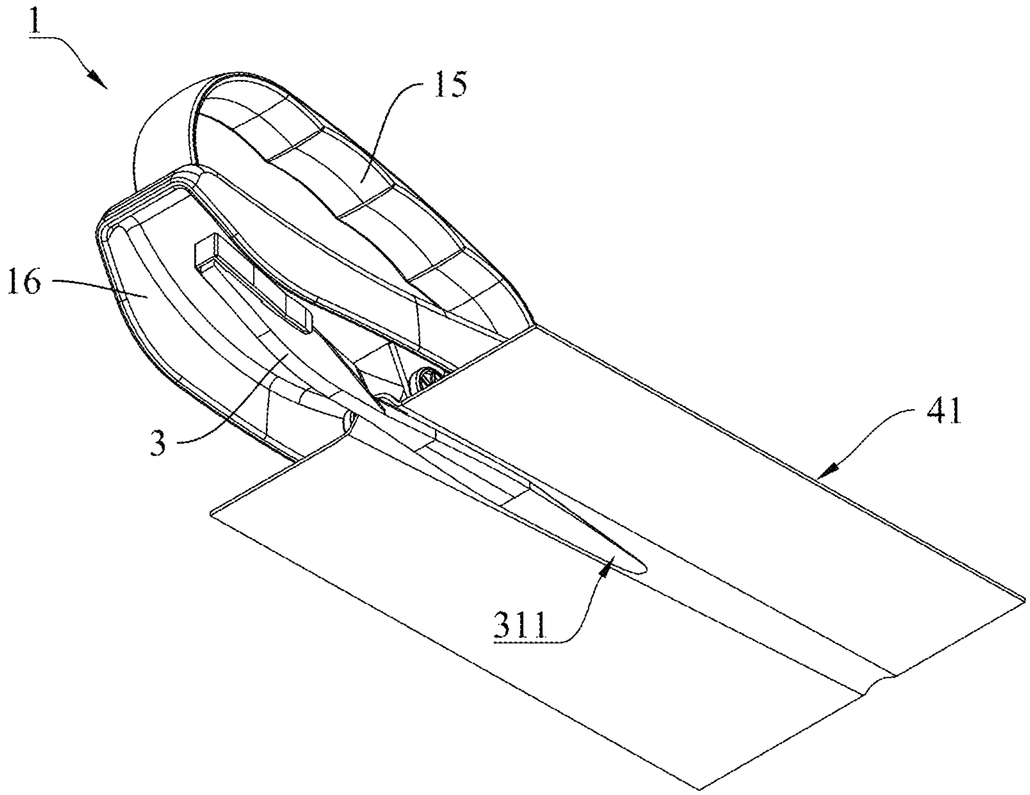
FIG. 6 is a schematic structural view of the paper cutter shown in FIG. 4 according to embodiment 2 of the present disclosure, in which the paper cutter is in the state of cutting paper.
Figure 7:
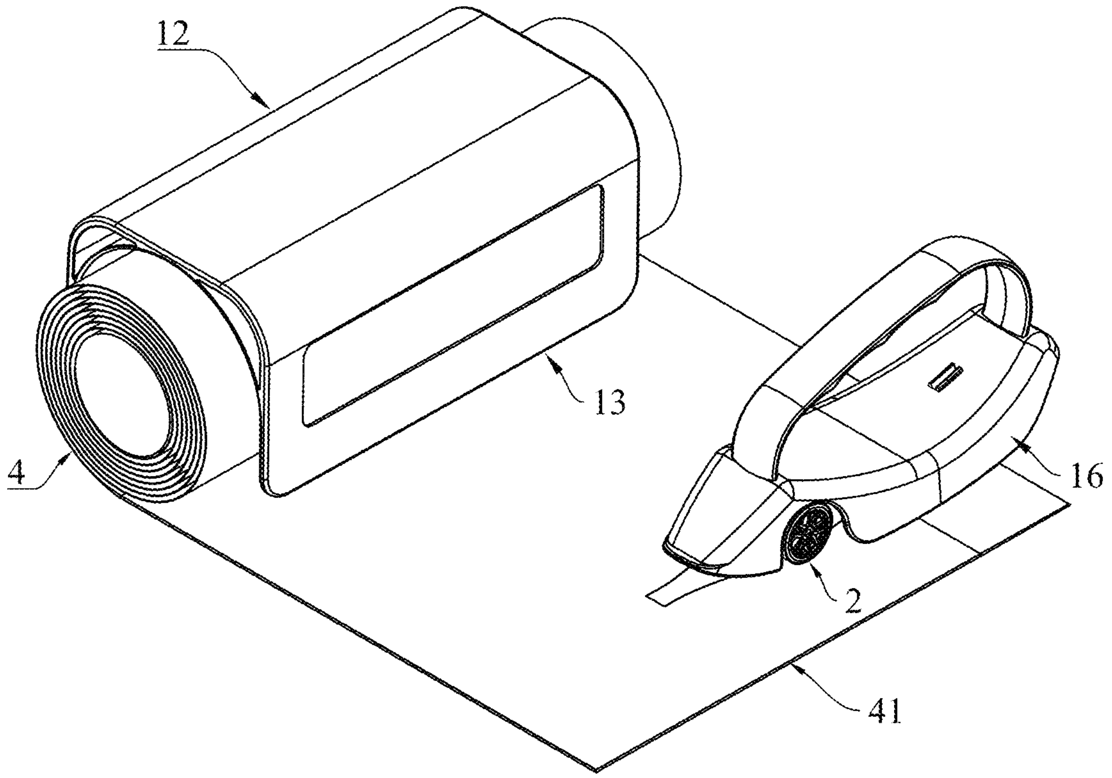
FIG. 7 is a schematic structural view of a paper cutter and a paper distributor used together according to embodiment 3 of the present disclosure.
Figure 8:
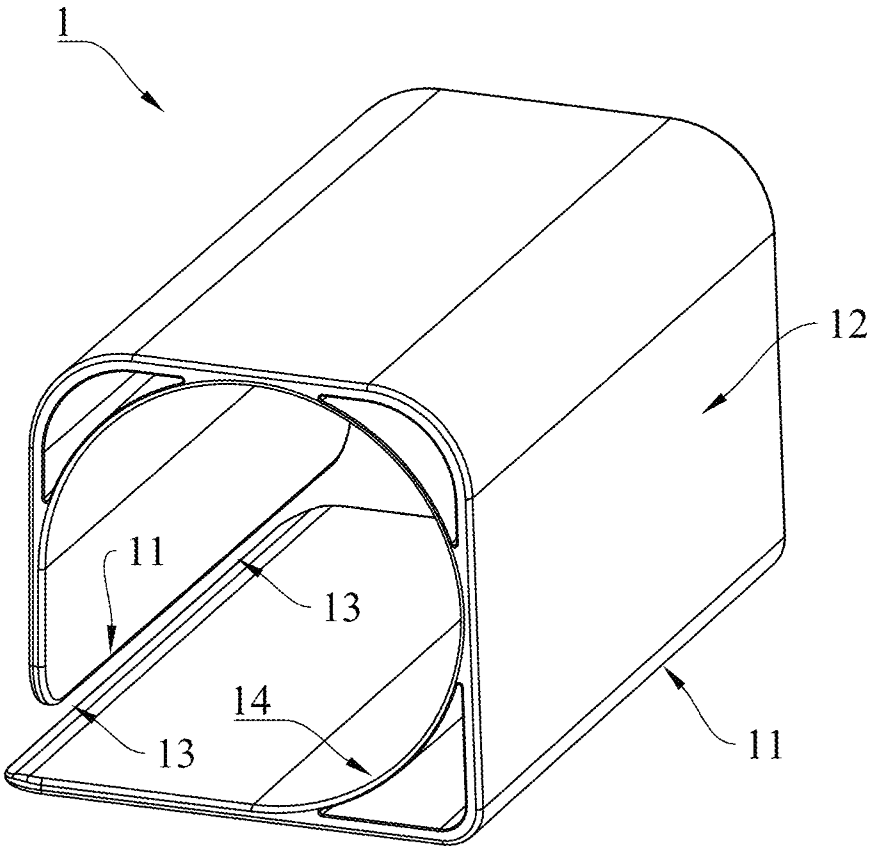
FIG. 8 is a schematic structural view of a paper distributor according to embodiment 3 of the present disclosure.
Figure 9:
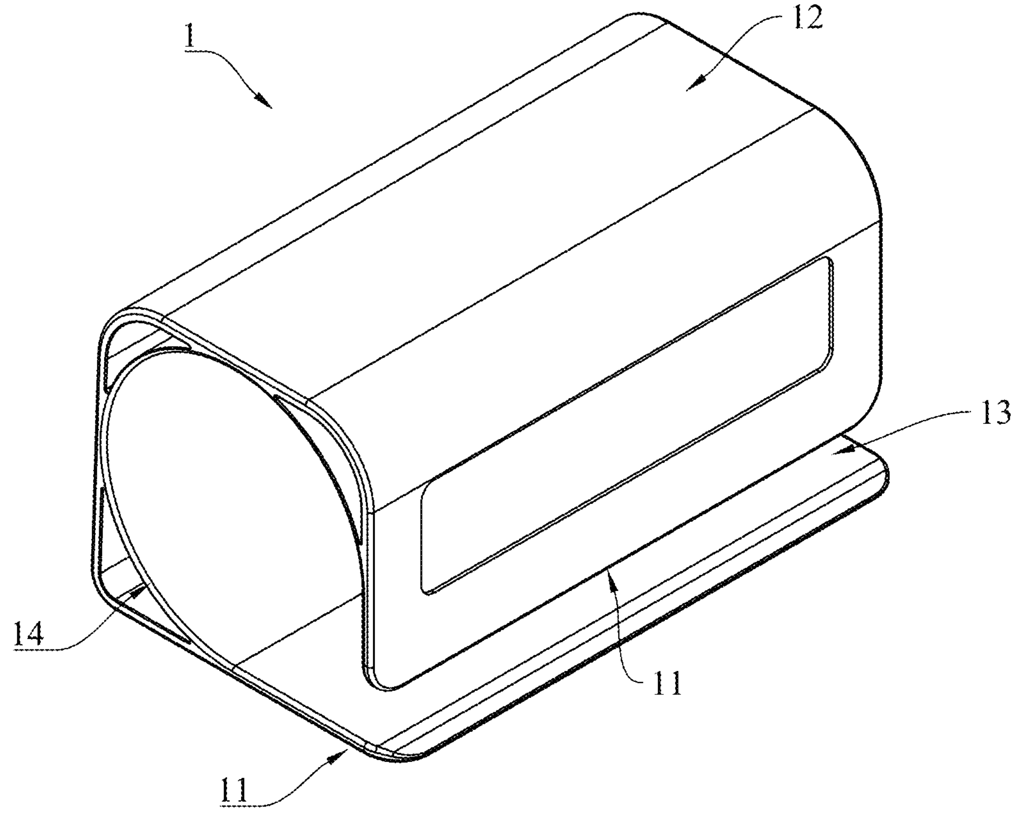
FIG. 9 is another schematic structural view of a paper distributor according to embodiment 3 of the present disclosure.
Figure 10:
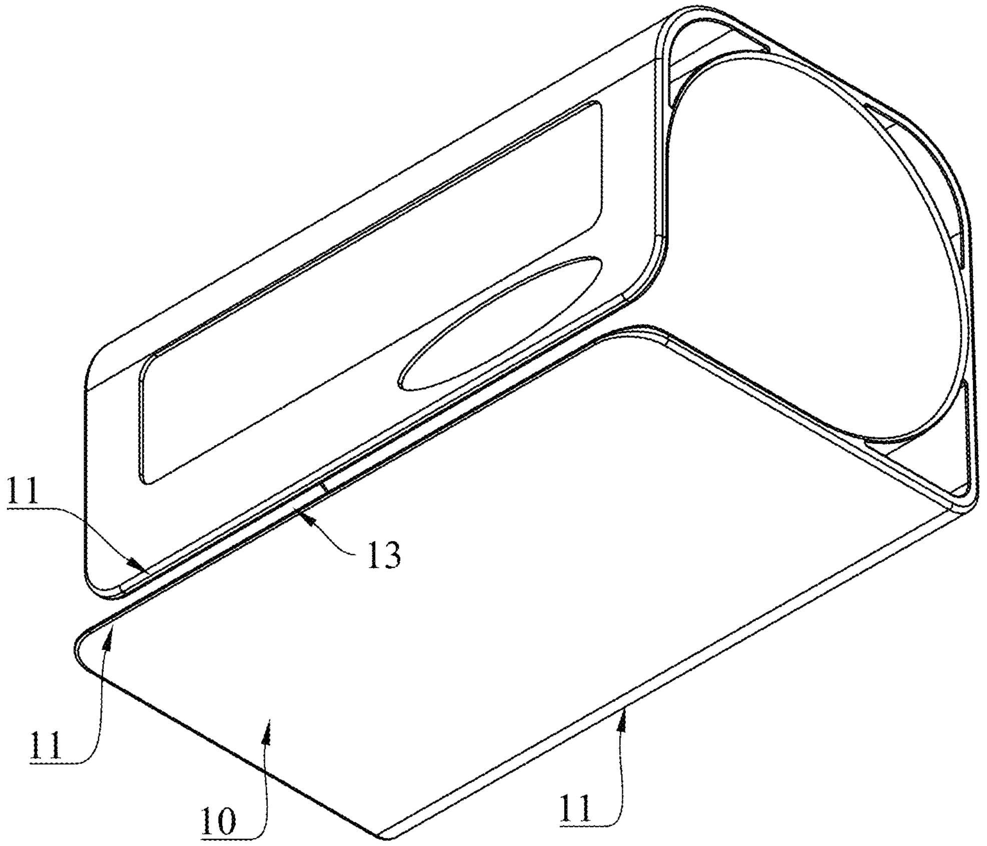
FIG. 10 is a schematic structural view of a contact plane of the paper distributor according to embodiment 3 of the present disclosure.
Figure 11:
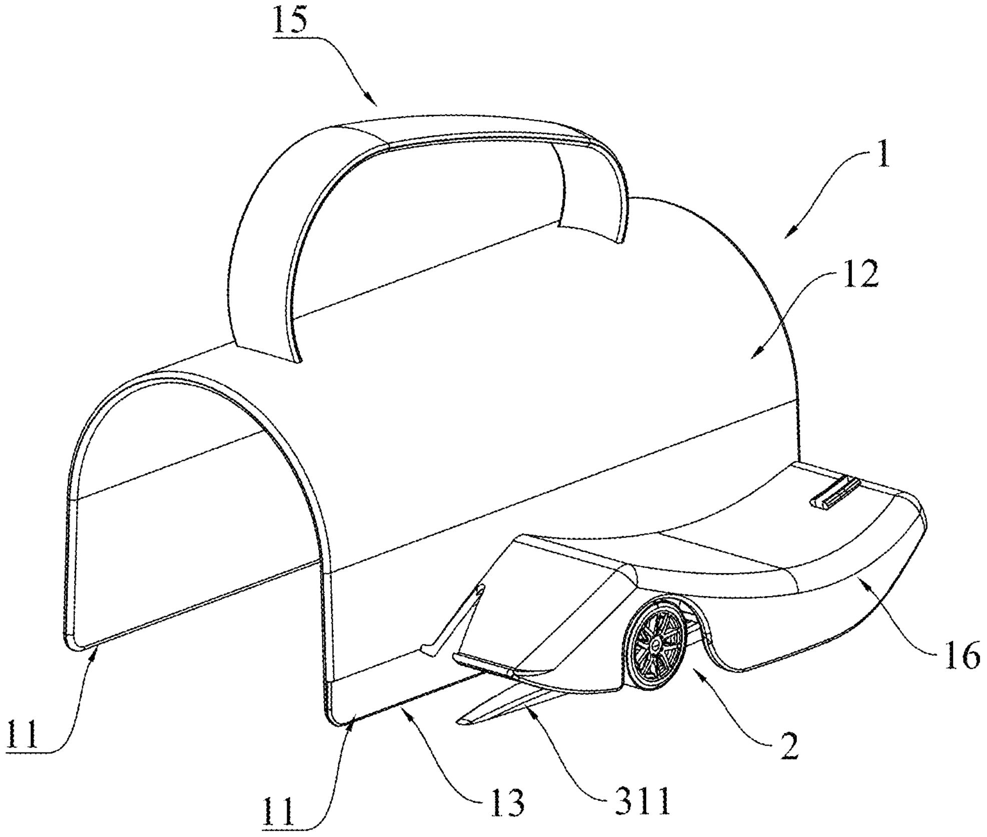
FIG. 11 is an overall schematic structural view of a paper cutting device according to embodiment 4 of the present disclosure.
Figure 12:
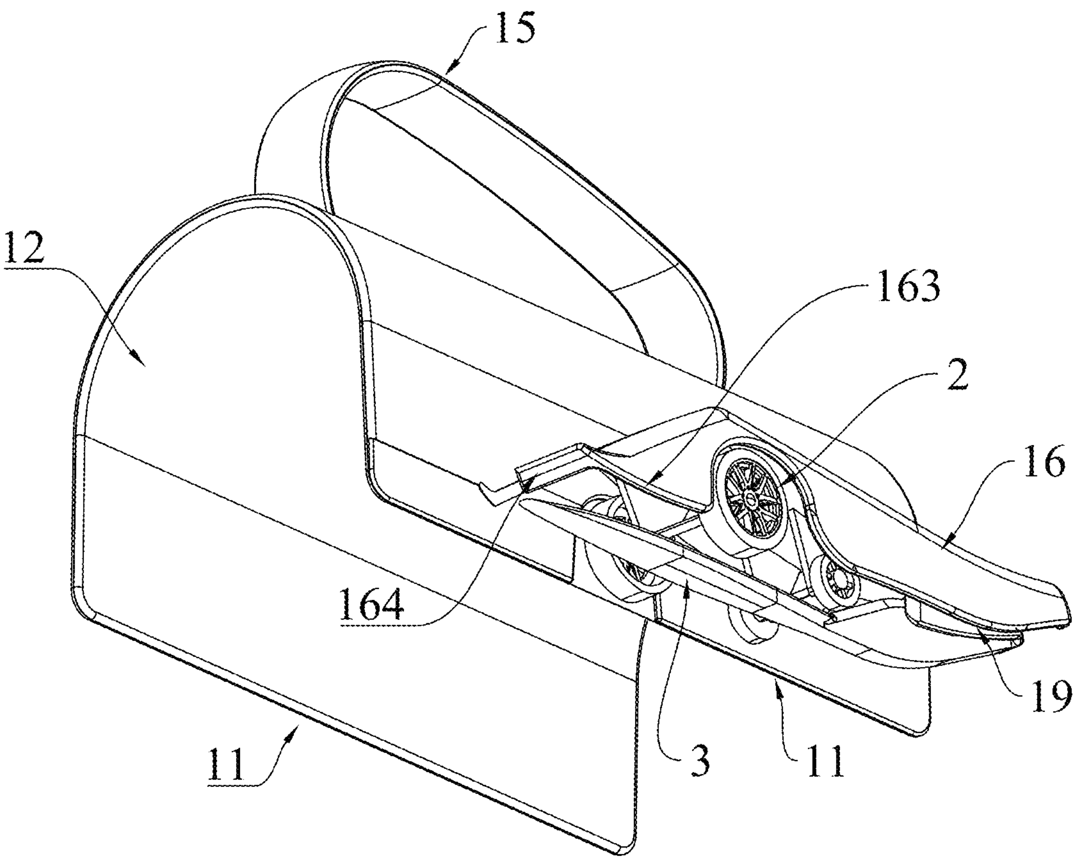
FIG. 12 is another overall schematic structural view of a paper cutting device according to embodiment 4 of the present disclosure.
Figure 13:
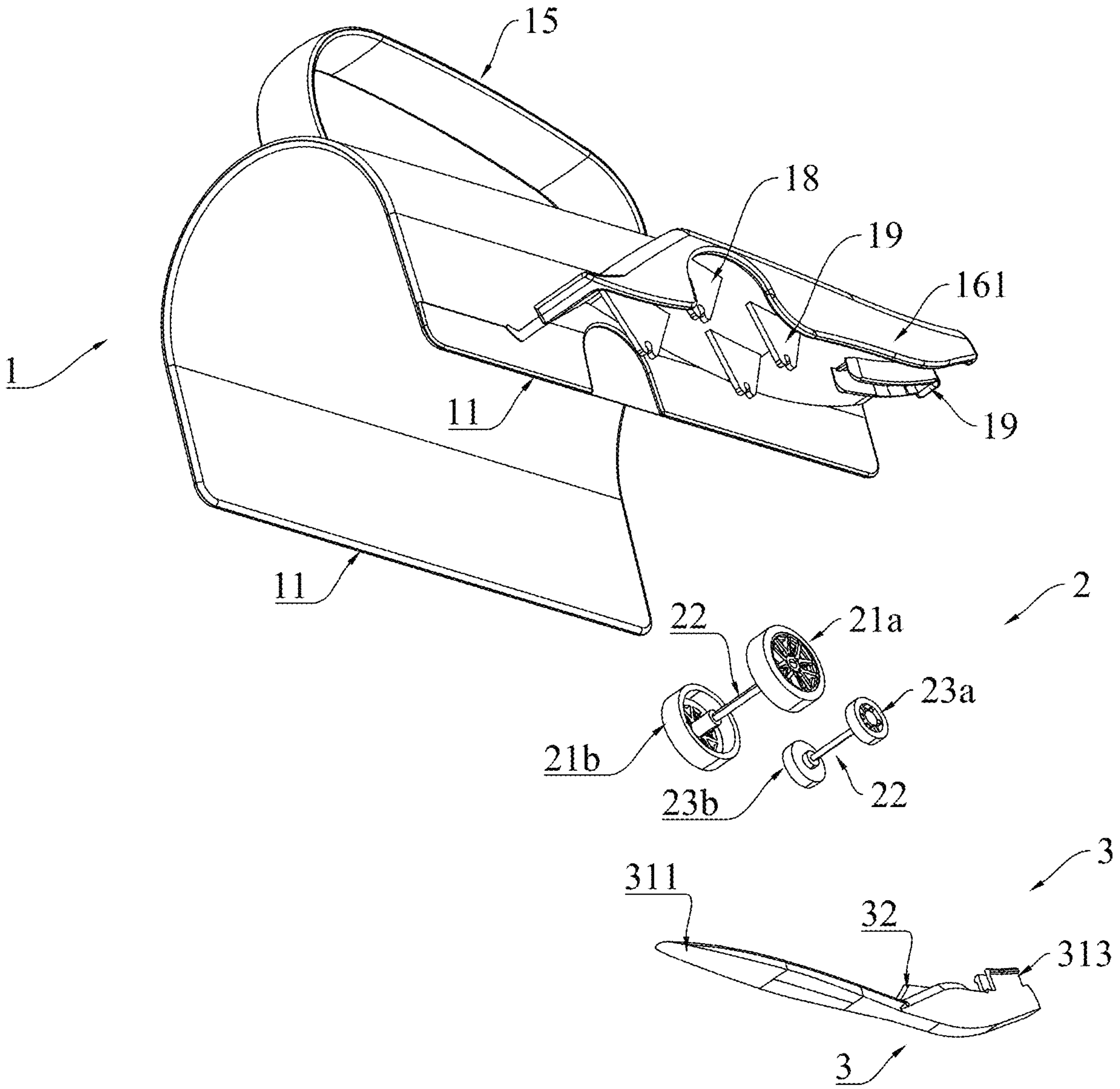
FIG. 13 is an exploded schematic structural view of the paper cutting device shown in FIG. 11.
Figure 14:
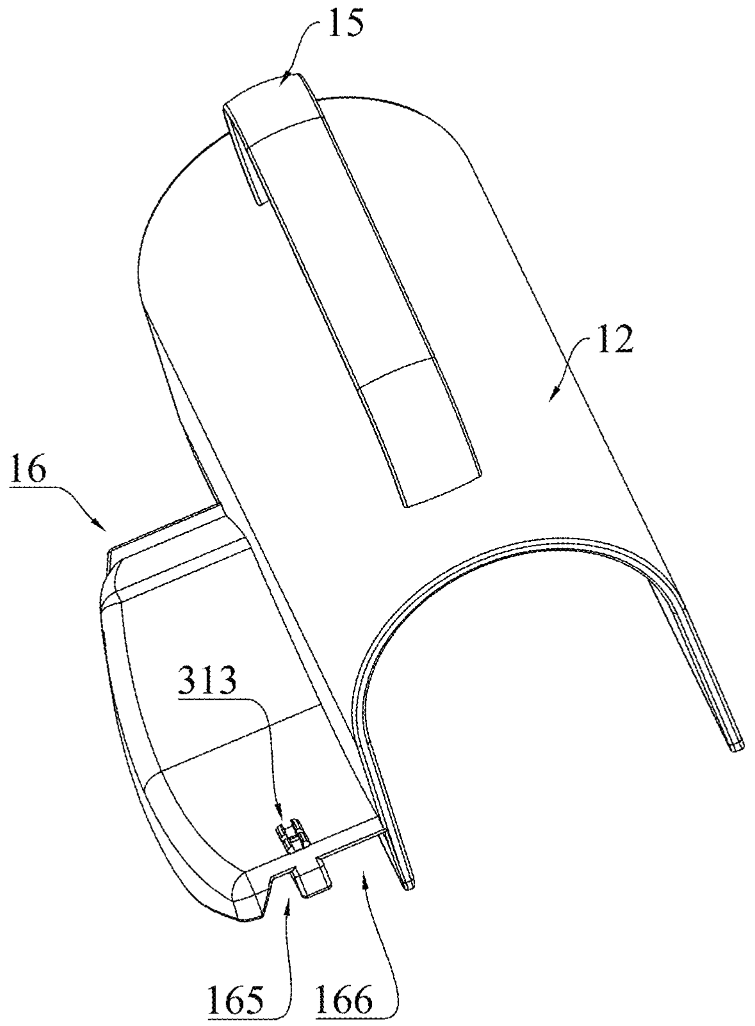
FIG. 14 is another overall schematic structural view of a paper cutting device according to embodiment 4 of the present disclosure.
Figure 15:
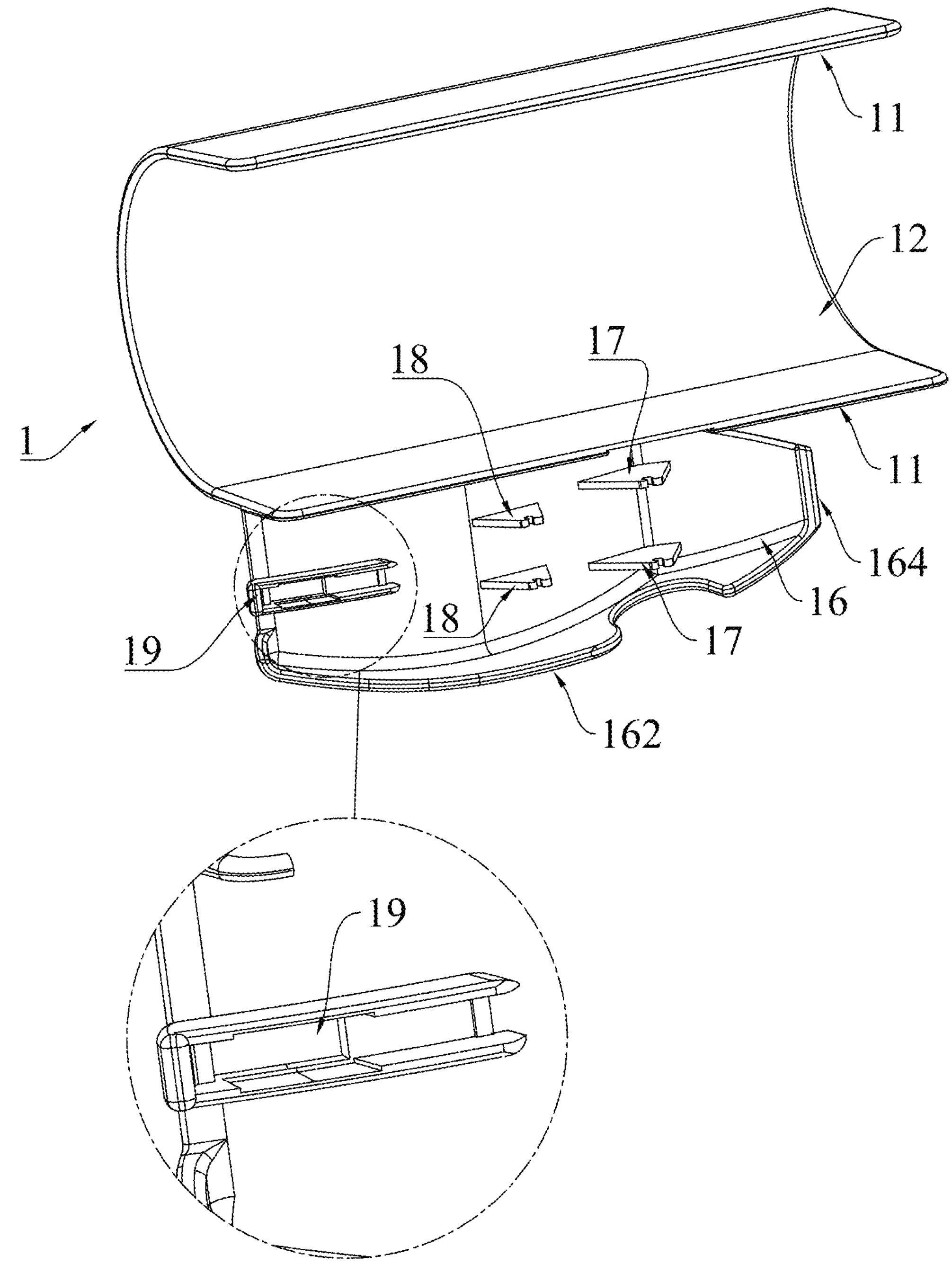
FIG. 15 is an internal schematic structural view of a housing of a paper cutting device according to embodiment 4 of the present disclosure.

As shown in FIG. 1, FIG. 2, and FIG. 6, according to an embodiment of the present disclosure, a cutter assembly 3 is provided. The cutter assembly 3 includes an object picking member 31. The object picking member 31 includes a first part 31*a* and a second part 31*b* connected to the first part 31*a*. The first part 31*a* of the object picking member 31 is thin and long, which may ensure that the paper 41 is accurately positioned during the cutting process. One end of the first part 31*a* of the object picking member 31 is a flat and sharp paper picking end 311. The flat and sharp paper picking end 311 may be accurately inserted under the paper 41 to reduce damage to the surface of the paper 41, especially for fragile or high-gloss paper 41. In addition, it may effectively protect the integrity of the paper 41, ensure that the edge of the paper 41 after cutting is smooth and burr-free, and improve the cutting quality.

The paper picking end 311 may extend under the paper to be cut 41 and lift it upward from the placement plane. The object picking member 31 is provided with a cutter 32, which is arranged at the second part 31*b* of the object picking member 31. A blade 321 of the cutter 32 faces the paper picking end 311, avoiding cutting of multiple sheets of paper synchronously or misalignment of cutting, thereby improving the accuracy and efficiency of cutting. The blade 321 of the cutter 32 is opposite to the traveling direction of the paper to be cut 41, ensuring the straightness and accuracy of the cutting is maintained regardless of whether it is for a straight cutting or cutting at a specific angle. It is suitable for cutting the paper 41 of different sizes and types, enhancing the versatility and adaptability of the cutter assembly.

An upper surface of the object picking member 31 from the paper picking end 311 to the blade 321 is a contact bearing surface 312. The contact bearing surface 312 is an arched and curved surface, and is configured to contact and support the paper 41 upward. The contact bearing surface 312 of the object picking member 31 is designed as an arched and curved surface, which may provide a large area and evenly distributed support points after the paper 41 is picked up, ensuring that the paper 41 is in a stable state before cutting, avoiding deviation or shaking during the cutting process, thereby improving the cutting accuracy and the flatness of the paper 41. The arched and curved contact bearing surface 312 has a better fit with the paper 41, and both thin paper and thick cardboard may be well supported, ensuring the consistency of the cutting process and the wide range of application scenarios.

The blade 321 of the cutter 32 is tilted with respect to the contact bearing surface 312, which facilitates the paper 41 to naturally lean toward the blade 321 during the paper feeding process, reducing cutting resistance, making the cutting process smoother, and ensuring that the cutting edges are neater and cleaner. Therefore, the overall quality and efficiency of cutting is improved. The tilting direction of the blade 321 forms a slanted angle with respect to the plane of the paper feeding direction of the paper to be cut 41, and the preferred angle is 45° to 135°. The optimal angle is designed within the range of 45° ~135°, which may significantly improve the efficiency of the cutting process and the quality of the surface of the paper to be cut. Within this angle range, the blade may cut the paper with minimal resistance, reducing distortion and debris during cutting, making the cutting edge flatter and smoother, and improving the aesthetics and usability of the finished product. By selecting an appropriate angle, the force and energy consumption required during cutting and the operating costs of the device may be reduced. Meanwhile, an appropriate slanted angle may also optimize the force distribution of the device, reduce friction and wear between the blade and the paper, extend the service life of the device, and reduce maintenance costs. This angle range helps to maintain stable contact between the blade and the paper during the cutting process, avoid knife skipping or deflection, and ensure the straightness and accuracy of the cutting line, especially in continuous high-speed cutting operations. This kind of design promotes stability and consistency throughout the production process.

Embodiment 2

As shown in FIG. 1 to FIG. 7, according to an embodiment of the present disclosure, a paper cutter is provided. The paper cutter includes a cutter assembly 3. The cutter assembly 3 includes an object picking member 31 and a cutter 32. A first end of the object picking member 31 has a paper picking end 311, which may reach under the paper to be cut 41 and lift it up. The paper picking end 311 may accurately separate the paper 41 from a stack of paper and lift it up, ensuring that only one single piece is cut each time, avoiding cutting multiple sheets of paper synchronously and improving the cutting accuracy. The picking member 31 is provided with a cutter 32 near its second end. A blade 321 of the cutter 32 corresponds to the traveling direction of the paper to be cut 41, ensuring the continuity and efficiency of the cutting process. A second end of the object picking member 31 has an elastic buckle 313, and a paper cutter housing 16 is provided with an elastic buckle mounting groove 19. The second end of the object picking member 31 is detachably connected to the elastic buckle mounting groove 19 through the elastic buckle 313.

A housing 1 includes the paper cutter housing 16. The cutter assembly 3 is connected to the paper cutter housing 16. Left and right sides of the paper cutter housing 16 have downwardly extending side portions 161. Lower edges 162 of the left and right side portions 161 may be pressed down on both sides of the paper to be cut 41 picked up by the object picking member 31, and the two sides of the picked up paper 41 may be pressed onto the placement surface before cutting, effectively preventing the paper 41 from moving or curling during the cutting process. Therefore, the stability of the cutting process is ensured and the flatness of the cutting edge and overall cutting quality is improved. The second end of the object picking member 31 is connected to the paper cutter housing 16. The paper 41 is divided into two pieces from the second end of the object picking member 31. The pressing and releasing effect of the side portions 161 reduces the risk of an operator's direct contact of the blade and improves the safety of use. Meanwhile, the operation process is simpler. The user only needs to place the paper 41, and the rest of the positioning and pressing actions are automatically completed by the device.

A pressure guide assembly 2 is connected to the paper cutter housing 16 and is arranged between the left and right side portions 161. When the paper to be cut 41 enters the cutter assembly 3, the pressure guide assembly 2 assists in positioning and guiding the paper to be cut 41 to slide straightly toward the blade 321. The pressure guide assembly 2 not only simplifies the guiding step of the paper 41, but also automatically assists in positioning and guiding when the paper 41 enters the cutter assembly 3, which greatly improves the fluency and automation level of the operation, reduces the troublesomeness of manual operation, and improves work efficiency.

The paper picking end 311 is exposed outward with respect to the paper feeding end 164 of the paper cutter housing 16, which may optimize the paper guiding process. The paper picking end 311 is exposed outward such that the paper 41 is easier to be guided into the cutter assembly 3, and the user does not need to laboriously stuff the paper 41 into a small space, which improves the convenience for use.

An upper surface from the paper picking end 311 to the blade 321 is a contact bearing surface 312 configured for contacting the paper to be cut 41. The contact bearing surface 312 serves as a smooth transition surface, which helps the paper 41 to smoothly transit from the paper picking end 311 to the blade 321, reduces the wrinkles or deviations of the paper 41 during the transmission process, and ensures the positioning accuracy before cutting.

The pressure guide assembly 2 includes a paper pushing member 21, which is connected to the paper cutter housing 16 by means of a paper pushing member mounting rib 17 arranged in the housing 1. The paper pushing member 21 is arranged near the paper feeding end 164 of the paper cutter housing 16. The paper pushing member 21 includes a first paper pushing member 21*a* and a second paper pushing member 21*b*, which are respectively arranged on the left and right sides of the object picking member 31. When the paper to be cut 41 enters from the paper picking end 311 toward the blade 321, the first paper pushing member 21*a* and the second paper pushing member 21*b* are positioned toward the blade 321 and guide the paper to be cut 41. The automatic guiding function of the paper pushing member 21 may adapt to the paper 41 of different thicknesses and materials. Even thinner or thicker paper 41 may be effectively controlled, avoiding the problem of thin paper jamming or thick paper being difficult to guide, increasing the versatility of the device and the convenience for use.

The pressure guide assembly 2 also includes a paper guide member 23, which is connected to the paper cutter housing 16 by means of a paper guide mounting rib 18 arranged in the housing 1. The paper guide member 23 is arranged near a front end of the blade 321 of the cutter 32.

The paper guide member 23 includes a first paper guide member 23*a* and a second paper guide member 23*b*, which are respectively arranged on the left and right sides of the object picking member 31, and may accurately guide and position the paper 41 that is about to enter the cutter area, ensuring that the paper 41 remains centered when it enters the cutting stage, avoiding cutting deviation, and improving the cutting accuracy and the straightness of the cutting edge of the paper 41. The symmetrical layout of the first paper guide member 23*a* and the second paper guide member 23*b* applies balanced pressure to the paper 41, ensuring the stability of the paper 41 during high-speed or continuous cutting, preventing the paper 41 from drifting or deviating from the center, and maintaining good control even when processing thin paper or highly slippery materials. When the paper to be cut 41 is guided from the bottom contact point of the paper pushing member 21 toward the blade 321, the first paper guide member 23*a* and the second paper guide member 23*b* have the function of positioning and guiding the paper to be cut 41 toward the blade 321. The paper guide member 23 arranged at the front end of the blade 321 cooperates with the paper pushing member 21 to form a smooth guiding channel from the bottom contact point of the paper pushing member 21 to the blade 321, which not only makes the paper 41 smoother during the guiding process, reduces the risk of distortion or folding of the paper 41, but also improves the continuity and efficiency of the entire cutting process. The design of the paper guide member 23 takes into account the processing requirements of the paper 41 with different widths and thicknesses. Its flexible guiding mechanism may adapt to the paper 41 with various sizes, enhance the versatility of the paper cutter, and meet the diverse cutting operation requirements. The precise guiding function of the paper guide member 23 reduces the possibility of abnormal contact between the paper 41 and the cutter, thereby reducing the risk of tearing or jamming of the paper 41 during the guiding and cutting process, protecting the integrity of the paper 41, and extending the maintenance cycle of the device.

The spacing between the first paper pushing member 21*a* and the second paper pushing member 21*b* is greater than that between the first paper guide member 23*a* and the second paper guide member 23*b*. When the pressure guide assembly 2 guides the paper to be cut 41, a bending stress from outside to inside is formed from a paper contact point between the paper pushing member 21 and the paper to another paper contact point between a bottom of the paper guide member 23 and the paper. The paper 41 is gradually compressed and precisely aligned during the guiding process. This design helps the paper 41 to form a more flat and compact state before being guided into the cutter 32, reducing deviation during cutting and improving cutting accuracy. It is conducive to further stabilizing the moving trajectory of the paper 41, ensuring that the paper 41 maintains the correct guidance and position when entering the cutting area. The bending stress helps to control the curvature of the paper 41, avoiding deviation or wrinkles when pushing at high speed or cutting thicker paper 41, and improving the stability and reliability of the cutting process. The paper 41 may be positioned with minimal deformation and highest flatness before entering the cutting stage, reducing resistance and unnecessary pauses during the cutting process, and improving cutting efficiency. In addition, it reduces cutting quality problems caused by unevenly placed paper 41, such as paper scraps and uneven cutting edges, thereby improving the aesthetics and use value of the finished product. The design adapts to paper 41 of different thicknesses and materials by adjusting the spacing between the paper pushing member and the paper guide member, increasing the adaptability and versatility of the device. Whether it is thin paper or thicker cardboard, it may be effectively controlled and guided though this design to ensure the consistency of the cutting effect.

Each of the lower edges 162 of the two side portions 161 near the paper picking end 311 has a smooth paper guide edge 163 bending from top to bottom and has a positive curvature. The smooth curved design of the paper guide edge 163, especially its positive curvature, may provide a natural and continuous guiding surface when the paper 41 is lifted by the paper picking end 311 and guided to move toward the cutter 32. Such a design helps the paper 41 to move smoothly along a predetermined path before entering the cutting process, reduces the jamming or folding of the edge of the paper 41, ensures that the paper 41 may be accurately positioned at the cutting position, and improves the preparation efficiency and accuracy of the cutting. The positive curvature of the paper guide edge 163 may contact the edge of the paper 41 in a softer way. Compared with the design of a sharp angle or right angle, it may effectively reduce the damage caused by friction or extrusion of the paper 41 during the guiding process, such as tearing or leaving indentations, thereby protecting the integrity of the paper 41, and is particularly suitable for application scenarios with high requirements on the appearance of the paper 41. During operation, even if the paper 41 is thick or slippery, the positioning of the paper 41 may be completed more smoothly through the guiding effect of the paper guide edge, reducing the risk of operational errors.

The lowest point of the pressure guide assembly 2 is on a same horizontal plane as the lowest point of the lower edge 162 of the side portion 161, i.e. the lowest point of the pressure guide assembly 2 is aligned with the lower edge 162 of the side portion 161 of the paper cutter housing 16, forming a flat and continuous import and export channel for the paper 41. This design helps the paper 41 to maintain smooth and unimpeded movement during the guiding and cutting process, avoids the paper 41 from being stuck, folded or damaged due to height difference, and improves the smoothness of cutting and the continuous processing of paper 41. It is crucial to improve cutting accuracy to ensure that the paper 41 is always kept at a stable horizontal height during the process of being guided into the cutter 32 by the pressure guide assembly 2. The smooth guiding of the paper 41 reduces upper and lower deviations of the cutting position, making the cutting line more accurate, and improving the qualified rate and quality of the finished product. The structure of the pressure guide assembly 2 and the paper cutter housing 16 is more stable, reducing vibration or unnecessary mechanical wear caused by uneven contact during operation, extending the service life of the device, while also reducing operating noise and improving the stability and durability of the device.

Embodiment 3

As shown in FIG. 7 to FIG. 10, according to an embodiment of the present disclosure, a paper distributor is provided. The paper distributor has a housing 1, and also includes a paper distributor housing 12. The paper distributor housing 12 has a hollow structure with an inner diameter greater than a diameter of the paper tube 4 carrying the paper to be cut 41, ensuring that the paper tube 4 may be firmly placed and freely rotate along its axis in the paper distributor housing 12 when the paper 41 moves smoothly in and out, reducing the blockage of the paper 41 during loading and processing, and improving the processing speed and operation efficiency. Additionally, the paper 41 may maintain a good flatness before cutting, which improves the accuracy of cutting. A side wall of the paper distributor housing 12 is defined with a paper discharging port 13, and the paper to be cut 41 may be pulled out from the paper discharging port 13 and then be cut, making the positioning and cutting process of the paper 41 more direct and efficient. In addition, the arrangement of the position of the paper discharging port 13 helps to control the stretching direction and speed of the paper 41, reduce the disordered movement of the paper 41 before cutting, and prevent the paper 41 from being damaged or wrinkled.

A side wall of the paper distributor housing 12 is arranged with at least one parallel guide rail 11. The parallel guide rail 11 is parallel to an axis of the paper distributor housing 12. At least one parallel guide rail 11 is adjacent to the paper discharging port 13. The parallel guide rail 11 may prevent the paper tube 4 from being pulled out from the paper discharging port 13 while ensuring smooth paper discharge. Some parallel guide rails 11 provide additional support for the paper 41, while some parallel guide rails 11 play a pressure-guiding role for the smooth delivery of the paper 41, thereby preventing the paper 41 from deflecting or twisting during the pulling process. Moreover, it increases the stability of the paper 41 before cutting due to the positioning function of the parallel guide rail 11, ensuring the continuity and accuracy of the cutting process. In addition to guiding the paper 41 to be discharged smoothly, the parallel guide rail 11 also prevents the paper tube 4 from being accidentally pulled out from the paper discharging port 13. This detailed design reflects safety consideration for the user, avoids possible device damage or personal injury caused by improper operation, enhances safety of use, and also improves user experience.

An outer wall of the paper distributor housing 12 has a contact plane 10, and the contact plane 10 is a plane for contacting with the placement plane. The contact plane 10 directly contacts the placement plane instead of contacting sharp edges or points, which may effectively reduce wear or damage to the placement plane (such as a desktop, a workbench), protect the working environment, and extend the service life. The contact plane 10 may be a support surface of the paper distributor housing 12 formed by at least two parallel guide rails 11. It may ensure that the paper distributor has a more stable contact with the work surface or the placement plane. Its support surface increases the overall stability of the device, prevents displacement or shaking caused by external forces during operation, thereby ensuring cutting accuracy and operational safety. The parallel guide rails 11 not only serve as a supporting structure, but also as a linear guiding component for the guiding and discharge of the paper 41. The parallel guide rails 11 are parallel to the placement plane, ensuring that the paper 41 moves along a straight path when entering and exiting the paper distributor, reducing the risk of deflection or paper jam, and improving the smoothness of the paper 41 processing and cutting accuracy.

An inner wall of the paper distributor housing 12 has a circumferentially arranged slanted strip 14. Based on the contact principle of physics, when the paper 41 in the paper roll 4 is pulled out, the paper roll 4 rotates accordingly. During the rotation process, the paper roll 4 contacts the slanted strip 14. Due to the guiding effect of the tilted surface, the paper roll 4 will be guided and close to an inner wall of the paper distributor housing near the paper discharging port 13. The slanted strip 14 is arranged on the side wall corresponding to the paper discharging port 13. When the paper 41 is being pulled out from the paper roll 4, the paper roll 4 rotates in the paper distributor housing 12. When the paper roll 4 rotates and rolls to the slanted strip 14, the paper roll 4 will slide down to the inner wall of the paper distributor housing 12 near the paper discharging port under the obstruction of the slanted strip 14. It is ensured that when the paper 41 is pulled out, the paper roll 4 and the paper discharging port 13 maintain the most optimized position relationship, which facilitates the paper 41 to be pulled out of the paper discharging port 13 smoothly and accurately, and avoids the obstruction or distortion of the paper 41 during the pulling process. Through the guiding effect of the slanted strip 14, the paper roll 4 may quickly and stably adjust its own position during the rotation process, reducing the resistance when the paper 41 is pulled out, making the paper 41 separation processes faster and more coherent, improving user experience, and also improving overall work efficiency. The arrangement of the slanted strip 14 makes the contact between the paper tube 4 and the inner wall of the paper distributor housing 12 smoother and more controllable, avoiding the wear of the inner wall of the paper tube 4 or the paper distributor housing 12 that may be caused by direct friction, while reducing unnecessary noise and making the device run more quietly and lastingly. When the user extracts the paper 41, there is no need to make special efforts or perform complicated operations. The automatic guiding function of the slanted strip 14 simplifies the operation process, making it easy for even first-time users to get started, improving the usability of the product. The slanted strip 14 does not depend on the specific size or material of the paper tube 4. The arrangement of the slanted strip 14 enables the paper distributor housing 12 to be compatible with paper rolls 4 of a various specifications, enhancing versatility and market adaptability of the product.

At least two slanted strips 14 are provided. By providing at least two slanted strips 14 on the inner wall of the paper distributor housing 12, the position adjustment of the paper tube 4 during the rotation process may be guided more evenly and stably. The layout of two or more slanted strips ensures that no matter where the paper tube 4 rotates to, it may contact the slanted strips 14 in time. Therefore, the paper tube 4 is continuously being guided, avoiding from rolling or shifting randomly inside, and improving the guiding process stability of the paper 41. The slanted strips 14 are arranged circumferentially along the inner wall of the paper distributor housing 12, and the shape of the slanted strips 14 is a smooth arc strip or a wedged strip. The slanted strips 14 are designed as smooth arc strips or wedge-shaped strips reduces the friction resistance between the paper tube 4 and the slanted strips, making the paper tube 4 smoother when rolling, not causing unnecessary pulling or damage to the paper 41, ensuring the continuity and smoothness of the paper 41 when it is pulled out of the paper tube 4, and improving user experience. The circumferentially arranged slanted strips 14 may accurately control the rotation angle and final stop position of the paper tube 4 in the paper distributor housing 12 through their specific shape and position layout, and ensuring that the paper 41 may be accurately aligned with the paper discharging port 13. Therefore, it is convenient for the user to quickly and accurately extract a required length of paper 41, thereby improving the accuracy and efficiency of the operation.

A pressing handle 15 is connected to the housing 1, and the force direction of the pressing handle 15 is perpendicular to the contact plane 10 of the outer wall of the paper distributor housing 12. The pressing handle 15 is directly connected to the housing 1, providing the user with a clear force applying focus, such that the user may apply force more intuitively and conveniently when using the paper cutting device. The position of the pressing handle 15 is not limited to connecting to the outer wall of the paper distributor housing 12 or the outer wall of the paper cutter housing 16. By simplifying the operation process, the user does not need to find a suitable holding position, and the paper cutting device may be stably controlled directly through the pressing handle, ensuring that the force applied by the user is direct and effective. When pulling out the paper 41, the force may be transferred to the paper tube 4 in a more concentrated manner, avoiding low efficiency or damage to the paper 41 caused by force dispersion or improper direction, thereby improving the efficiency and accuracy of the paper separation operation.

Embodiment 4

As shown in FIG. 7, FIG. 11 to FIG. 17, according to an embodiment of the present disclosure, a paper cutting device is provided. The paper cutting device includes a housing 1. The housing 1 includes a paper distributor housing 12, which has a hollow structure. A side wall of the paper distributor housing 12 is defined with a paper discharging port 13. The housing 1 further includes a paper cutter housing 16. The paper cutter housing 16 shown in FIG. 7 and the paper distributor housing 12 are two separated structures. The paper cutter housing shown in FIG. 11 to FIG. 17 is arranged near the paper discharging port 13 and connected to an outer wall of the paper distributor housing 12. A cutter assembly 3 includes a object picking member 31. One end of the object picking member 31 has a flat and sharp paper picking end 311. The paper picking end 311 is exposed outward with respect to a paper feeding end 164 of the paper cutter housing 16. Another end of the object picking member 31 is connected to the paper cutter housing 16. A cutter 32 is provided near the other end of the object picking member 31, and a blade 321 of the cutter 32 corresponds to a traveling direction of the paper to be cut 41. A pressure guide assembly 2 is connected to an inside of the paper cutter housing 16. When the paper to be cut 41 enters the cutter assembly 3, the pressure guide assembly 2 assists in positioning and guiding the paper to be cut 41 to slide straightly toward the blade 321. The other end of the object picking member 31 has a elastic buckle 313, and the paper cutter housing 16 is provided with an elastic buckle mounting groove 19. The other end of the object picking member 31 is detachably connected with the elastic buckle mounting groove 19 be means of the elastic buckle 313.

The flat and sharp paper picker end 311 may be accurately inserted under the paper 41 and effectively pick up a single piece of paper 41, improving cutting accuracy and efficiency. Meanwhile, the blade 321 of the cutter 32 and the traveling direction of the paper 41 being aligned ensures a smooth and efficient cutting process, and reduces the deviation or damage of the paper 41 during the cutting process. The arrangement of the pressure guide assembly 2 inside the paper cutter housing 16 not only simplifies the operation process by assisting in positioning and guiding the paper 41 to slide straightly toward the cutter 32, but also ensures the stability and consistency of the paper 41 when it is guided into the cutting area, avoids bending or jamming of the paper 41, and improves the continuity and efficiency of cutting. The arrangement of the paper picking end 311 exposed outward with respect to the paper feeding end 164 of the paper cutter housing 16 allows the user to more intuitively and safely position and guide the paper 41 during operation, reduces the risk of fingers contacting the cutter, improves the safety of use and user experience. The combined arrangement of the paper cutter housing 16 and the paper distributor housing 12, and the hollow structure of the paper distributor housing, ensure the stable placement of the paper tube 4, reduce vibration and wear of the device during use, and enhance stability and durability of the overall structure.

The adjustable pressure guide assembly 2 and the precisely positioned cutter assembly 3 may adapt to paper 41 of different specifications and materials, thereby improving the application scenarios of the paper cutter, meeting diverse cutting needs, and enhancing versatility of the device. In summary, the paper cutter effectively improves cutting accuracy, efficiency and safety through the carefully designed cutter assembly, pressure guide assembly and housing, while ensuring the stability, durability and wide applicability of the device, and providing a user with an efficient, safe and easy-to-operate cutting solution.

The pressure-guiding assembly 2 includes a paper pushing member 21, which is connected to the paper cutter housing 16 by means of a paper pushing member mounting rib 17 disposed in the housing 1. The paper pushing member 21 is disposed near the paper feeding end 164 of the paper cutter housing 16. The paper pushing member 21 includes a first paper pushing member 21*a* and a second paper pushing member 21*b*, which are disposed on left and right sides of the object picking member 31 respectively. When the paper to be cut enters from the paper picking end 311 toward the blade 321, the first paper pushing member 21*a* and the second paper pushing member 21*b* are positioned toward the blade 321 and guide the paper to be cut. The pressure guide assembly 2 also includes a paper guide member 23, which is connected to the paper cutter housing 16 through a paper guide mounting rib 18 disposed in the housing 1. The paper guide member 23 includes a first paper guide member 23*a* and a second paper guide member 23*b*, which are disposed on the left and right sides of the paper picking end 311 respectively. When the paper to be cut is guided from a bottom contact point of the paper pushing member 21 toward blade 321, the first paper guide member 23*a* and the second paper guide member 23*b* position and guide the paper to be cut toward the blade 321. The pressure guide assembly 2 may accurately guide and position the paper. In other words, when the paper to be cut enters the cutter assembly 3, the pressure guide assembly 2 may accurately guide and position the paper 41 from the paper picking end 311 toward the blade 321. This design effectively avoids the deviation or wrinkles of the paper during the transportation process, and improves the accuracy and efficiency of cutting.

The first paper pushing member 21*a* and the second paper pushing member 21*b* are connected by a fixing shaft 22. The first paper pushing member 21*a* and the second paper pushing member 21*b* are a pair of rollers with a same outer diameter. The first paper pushing member 21*a* and the second paper pushing member 21*b* may rotate synchronously, which may ensure the synchronous and stable transmission of the paper pushing member 21.

The first paper guide member 23*a* and the second paper guide member 23*b* are connected by a fixing shaft 22, and the first paper pushing member 21*a* and the second paper pushing member 21*b* are a pair of rollers with a same outer diameter. The first paper guide member 23*a* and the second paper guide member 23*b* may rotate synchronously, which may ensure the synchronous and stable transmission of the paper guide member 23.

The first paper pushing member 21*a* and the second paper pushing member 21 are designed as rollers with the same outer diameter, and the first paper guide member 23*a* and the second paper guide member 23*b* are designed as rollers with the same outer diameter, such that they may rotate synchronously, ensuring the smoothness and continuity of the paper during the guiding process, reducing the damage that may be caused by uneven force applied on the paper, and also reducing the noise and vibration during the operation of the device, and improving the operation stability of the device.

The outer diameters of the first paper pushing member 21*a* and the second paper pushing member 21*b* are greater than those of the first paper guide member 23*a* and the second paper guide member 23*b*. The outer diameters of the paper pushing member 21 and the paper guide member 23 are different, and then the paper tension may be controlled in sections during the paper feeding process. The outer diameter of the paper pushing member 21 is greater than that of the paper guide member 23, and then the paper tension may be gradually adjusted during the paper transmission process, i.e. from a stronger guiding force of the paper pushing member to a more precise positioning of the paper guide, to achieve segmented optimization of control force. It not only ensures the smooth guiding of the paper, but also avoids unnecessary excessive pressure and protects the quality of the paper. When the pressure guide assembly 2 guides the paper to be cut 41, a bending stress from outside to inside is formed from a pressure contact point between the paper pushing member 21 and the paper 41 to another pressure contact point between a bottom of the paper guide member 23 and the paper 41. The paper 41 is gradually pressed and precisely aligned during the guiding process. It helps the paper 41 to form a more flat and compact state before being guided into the cutter 32, reducing deviation during cutting and improving cutting accuracy. It is conducive to further stabilizing moving trajectory of the paper 41, ensuring that the paper 41 maintains the correct guidance and position when entering the cutting area. The bending stress helps to control the curvature of the paper 41, avoiding deviation or wrinkles when pushing at high speed or handling thicker paper 41, and improving the stability and reliability of the cutting process. The paper 41 may be positioned with minimal deformation and highest flatness before entering the cutting process, reducing resistance and unnecessary pauses during the cutting process, and improving cutting efficiency.

Figure 16:
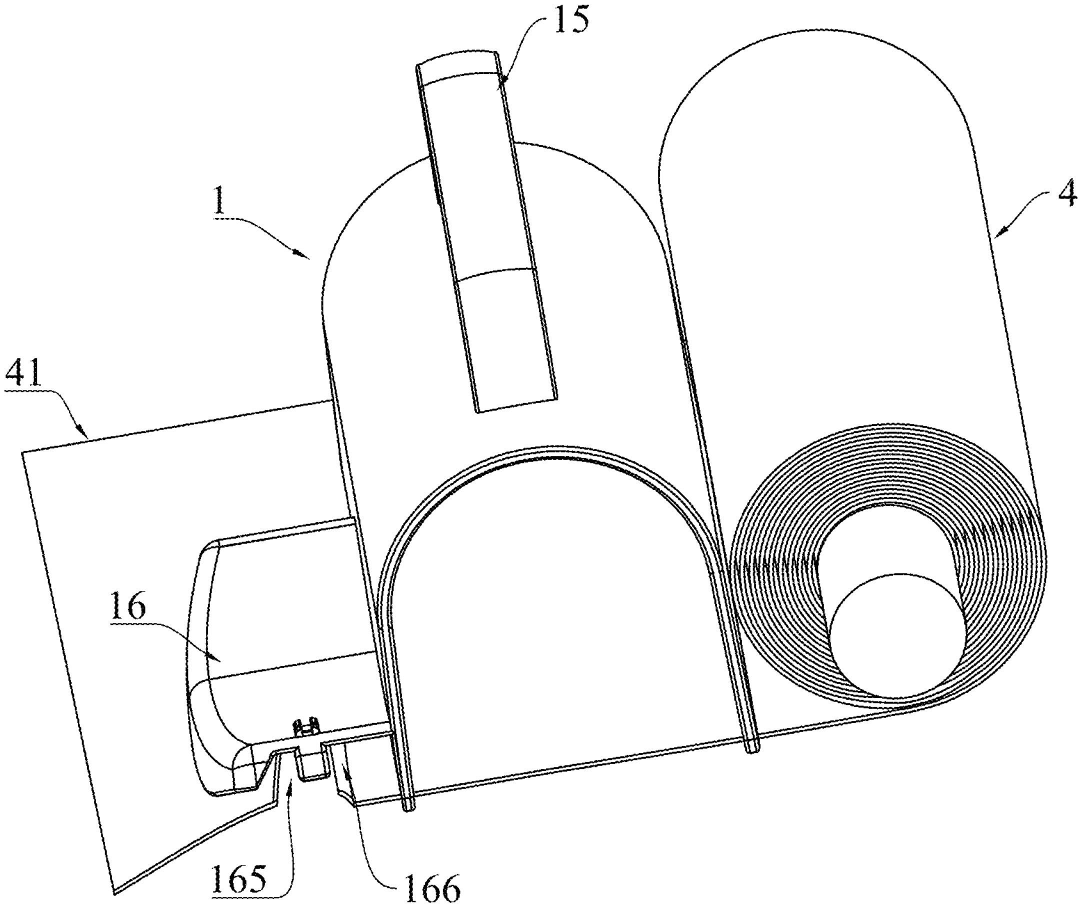
FIG. 16 is a schematic structural view of a paper cutting device suitable for large-size roll paper according to embodiment 4 of the present disclosure.

When the outer diameter of the paper tube 4 is greater than the inner diameter of the paper distributor housing 12, another solution is also provided according to an embodiment of the present disclosure. As shown in FIG. 16, the paper tube 4 is placed outside the paper distributor housing 12 and close to its outer wall. The paper tube 4 is directly placed outside the paper distributor housing 12, and is no longer limited by the inner diameter of the housing, which greatly expands the adaptability of the device to paper tubes of different specifications and improves the versatility and flexibility of the device. The parallel guide rails 11 on the bottom of the paper distributor housing 12 play a dual role. They not only play a physical support role to prevent the paper tube 4 from rolling or moving, but also directly press the bottom of the paper tube 4 to help the paper 41 to maintain a flatter state when it leaves the paper tube. This may reduce the wrinkles or bends of the paper during transportation, and improve the efficiency and quality of the finished product in the subsequent processing process. In the method shown in FIG. 16, there is no need to accurately match the diameter of the paper tube 4 and the paper distributor housing 12. It is only necessary to put the paper tube close to the outer wall of the housing to start the operation, which reduces the difficulty of operation and improves work efficiency.

Figure 17:
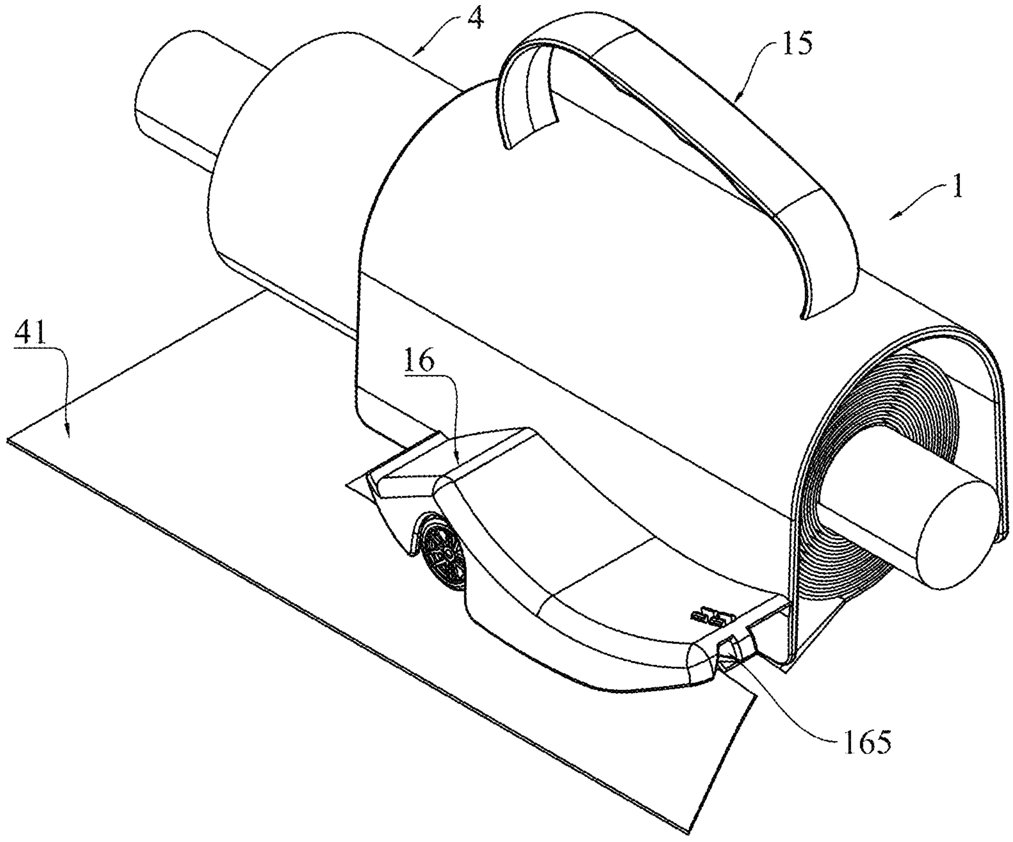
FIG. 17 is a schematic structural view of a paper cutting device suitable for roll paper smaller than an inner diameter of the paper cutting device according to embodiment 4 of the present disclosure.

The working principle of the paper cutter of the present disclosure is as follows. First, as shown in FIG. 17, the user puts the paper tube containing the paper to be cut into the paper distributor housing 12. The paper distributor housing 12 has a hollow structure with the inner diameter greater than the outer diameter of the paper tube 4, ensuring that the paper tube may be placed firmly and rotatable. The parallel guide rails 11 may prevent the paper tube 4 from being pulled out from the paper discharging port 13 while ensuring smooth paper discharge. The paper 41 in the paper tube 4 is smoothly pulled out from the bottom of the parallel guide rails 11, and the parallel guide rails 11 press the paper 41 toward the placement plane. One end of the paper 41 in the paper tube 4 is inserted into the bottom of the paper through the flat and sharp paper picking end 311. The flat and sharp paper picking end 311 is convenient to be inserted under the paper and gently picking it up, so as to prepare for subsequent cutting. When the paper cutting process is started, the pressure guide assembly 2 begins to work. The paper pushing member 21, especially its first paper pushing member 21*a* and the second paper pushing member 21*b*, are arranged on the left and right sides of the picking member 31, and push the paper smoothly toward the blade 321 by contacting the paper. Designing the paper pushing member 21 as a roller ensures the stability of the paper and reduces friction during the pushing process. Meanwhile, the synchronous rotation of the paper pushing member 21 ensures the uniform force and straight forward movement of the paper, avoiding the distortion or jamming of the paper. As the paper moves forward, the paper guide member 23 also begins to intervene in the paper guiding. The first paper guide member 23*a* and the second paper guide member 23*b* are located on both sides of the paper picking end 311. The first paper guide member 23*a* and the second paper guide member 23*b* are also connected by the fixing shaft 22 and may rotate synchronously, but the outer diameter of the paper guide member 23 is smaller than that of the paper pushing member 21. This arrangement is to further accurately control the position and tension of the paper before the paper enters the cutter assembly 3, ensuring that the paper reaches the cutting point in the best state. When the paper 41 is accurately guided to the position of the cutter 32 by the paper pushing member 21 and the paper guide member 23, the blade 321 is aligned with the traveling direction of the paper 41. As such, the paper 41 is quickly and accurately cut, and the cut paper 41 is discharged from the first paper discharging groove 165, and the uncut paper 41 is discharged from the second paper discharging groove 166. The arrangement and position of the blade 321 ensure efficient cutting and neat edges. The entire paper cutting process is achieved through the coordinated action of the carefully designed mechanical structure, such as the paper picking end, the paper pushing member 21, the paper guide member 23 and the cutter assembly, so as to achieve the precise guiding, stable advancement, precise cutting and smooth output of the paper 41 and ensure high-efficiency and high-quality paper processing effects.

The above is merely some preferred embodiments of the present disclosure and is not intended to limit the present disclosure, and various changes and modifications may be made on the present disclosure by those of ordinary skill in the art. Any modification, equivalent substitution, improvement, etc. made within the spirit and principles of the present disclosure should be included in the scope of protection of the present disclosure.

What is claimed is:

1. A paper cutter, comprising:

a cutter assembly, comprising an object picking member, wherein a first end of the object picking member has a paper picking end, the paper picking end is able to reach under paper and pick the paper up, and the object picking member is provided with a cutter near a second end of the object picking member, and a cutting edge of the cutter is opposite to a traveling direction of the paper to be cut;

a housing, comprising a paper cutter housing, wherein the cutter assembly is connected to the paper cutter housing, left and right sides of the paper cutter housing both comprise side portions extending downward, lower edges of the side portions of the left and right sides are able to press downward on two sides of the paper picked up by the object picking member, such that two sides of the paper are pressed on a placement plane, and a second end of the object picking member is connected to the paper cutter housing; and a pressure guide assembly, connected to the paper cutter housing and is arranged between the side portions of the left and right sides of the paper cutter housing, wherein the pressure guide assembly assists in positioning and guiding the paper to be cut to slide straightly toward the cutting edge in response to the paper to be cut entering the cutter assembly;

wherein the second end of the object picking member has an elastic buckle, and an elastic buckle mounting groove is provided in a top wall of the paper cutter housing, the second end of the object picking member is detachably connected to the elastic buckle mounting groove through the elastic buckle.

2. The paper cutter according to claim 1, wherein the paper picking end is exposed outward with respect to the paper feeding end of the paper cutter housing, and an upper surface from the paper picking end to the cutting edge is a contact bearing surface configured for contacting the paper to be cut.

3. The paper cutter according to claim 2, wherein the pressure guide assembly comprises a paper pushing member connected to the paper cutter housing, and the paper pushing member is arranged near the paper feeding end of the paper cutter housing; and the paper pushing member comprises a first paper pushing member and a second paper pushing member respectively arranged on left and right sides of the object picking member, and the first paper pushing member and the second paper pushing member position and guide the paper to be cut toward the cutting edge in response to the paper to be cut entering from the paper picking end toward the cutting edge.

4. The paper cutter according to claim 3, wherein the paper pushing member is connected to the paper cutter housing by means of a paper pushing member mounting rib arranged in the housing.

5. The paper cutter according to claim 3, wherein the first paper pushing member and the second paper pushing member are connected by means of a fixing shaft, the first paper pushing member and the second paper pushing member are a pair of rollers with a same outer diameter; the first paper pushing member and the second paper pushing member are rotatable synchronously.

6. The paper cutter according to claim 3, wherein the pressure guide assembly also comprises a paper guide member connected to the paper cutter housing, the paper guide member comprises a first paper guide member and a second paper guide member respectively arranged on the left and right sides of the object picking member, the first paper guide member and the second paper guide member position and guide the paper to be cut toward the cutting edge in response to the paper to be cut being guided from a bottom contact point of the paper pushing member toward the cutting edge.

7. The paper cutter according to claim 6, wherein a spacing between the first paper pushing member and the second paper pushing member is greater than that between the first paper guide member and the second paper guide member;

a bending stress from outside to inside is formed from a paper contact point between the paper pushing member and the paper to another paper contact point between a bottom of the paper guide member and the paper in response to the pressure guide assembly guiding the paper to be cut.

8. The paper cutter according to claim 6, wherein the paper guide member is connected to the paper cutter housing by means of a paper guide mounting rib arranged in the housing.

9. The paper cutter according to claim 6, wherein the first paper guide member and the second paper guide member are connected by means of a fixing shaft, the first paper pushing member and the second paper pushing member are a pair of rollers with a same outer diameter, and the first paper pushing member and the second paper pushing member are rotatable synchronously.

10. The paper cutter according to claim 2, wherein the contact bearing surface is an arched and curved surface.

11. The paper cutter according to claim 4, wherein each of the lower edges of the side portions of both sides near the paper picking end has a smooth paper guide edge bending from top to bottom and having a positive curvature.

12. The paper cutter according to claim 1, wherein a lowest point of the pressure guide assembly and a lowest point of the lower edge of the side portion are on a same horizontal plane.

13. A paper cutter, comprising:

a cutter assembly, comprising an object picking member, wherein a first end of the object picking member has a paper picking end, the paper picking end is able to reach under paper and pick the paper up, and the object picking member is provided with a cutter near a second end of the object picking member, and a cutting edge of the cutter is opposite to a traveling direction of the paper to be cut;

a housing, comprising a paper cutter housing, wherein the cutter assembly is connected to the paper cutter housing, left and right sides of the paper cutter housing both comprise side portions extending downward, lower edges of the side portions of the left and right sides are able to press downward on two sides of the paper picked up by the object picking member, such that two sides of the paper are pressed on a placement plane, and a second end of the object picking member is connected to the paper cutter housing; and a pressure guide assembly, connected to the paper cutter housing and is arranged between the side portions of the left and right sides of the paper cutter housing, wherein the pressure guide assembly assists in positioning and guiding the paper to be cut to slide straightly toward the cutting edge in response to the paper to be cut entering the cutter assembly;

wherein the pressure guide assembly comprises a paper pushing member and a paper guide member; the paper pushing member comprises a first paper pushing member and a second paper pushing member; the paper guide member comprises a first paper guide member and a second paper guide member;

a spacing between the first paper pushing member and the second paper pushing member is greater than that between the first paper guide member and the second paper guide member;

a bending stress from outside to inside is formed from a paper contact point between the paper pushing member and the paper to another paper contact point between a bottom of the paper guide member and the paper in response to the pressure guide assembly guiding the paper to be cut.

* * * * *